Feb. 24, 1925.
M. FELD
1,527,352
FLUID DISPENSING DEVICE
Filed May 4, 1923
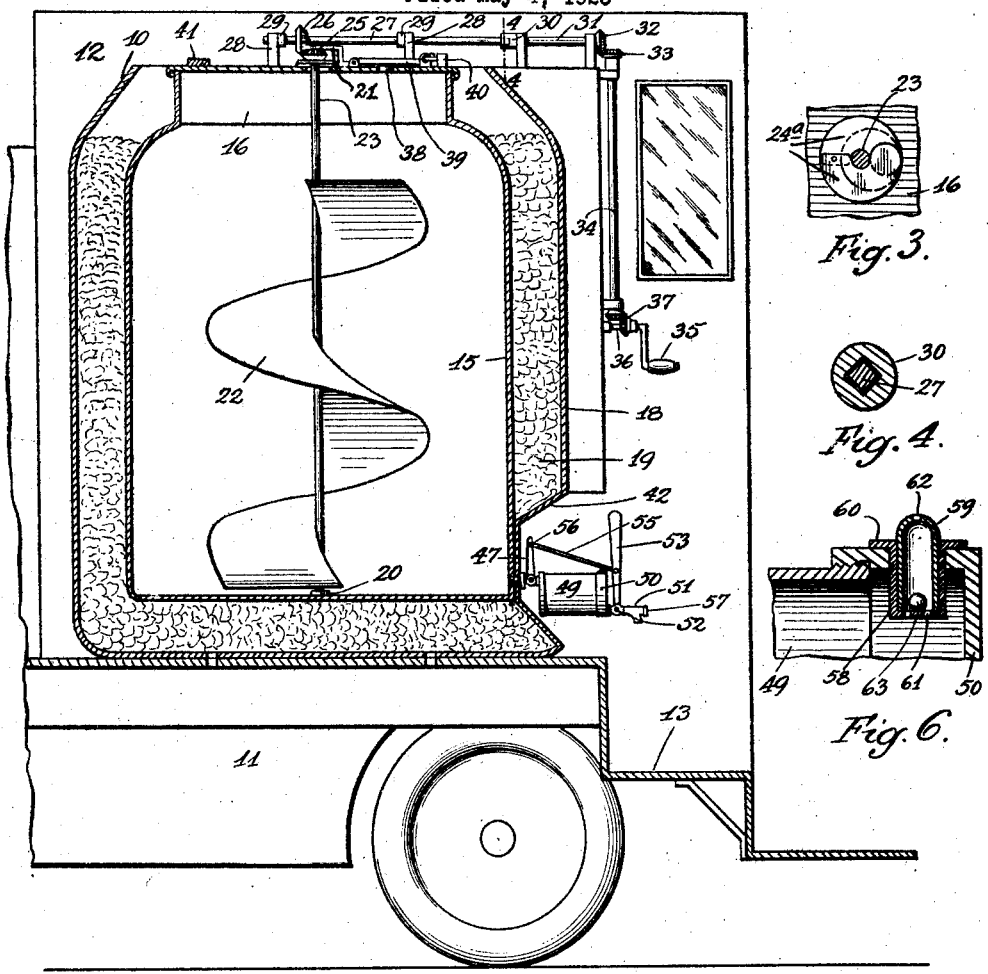
Fig. 1.
Fig. 3.
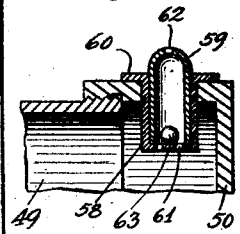
Fig. 6.
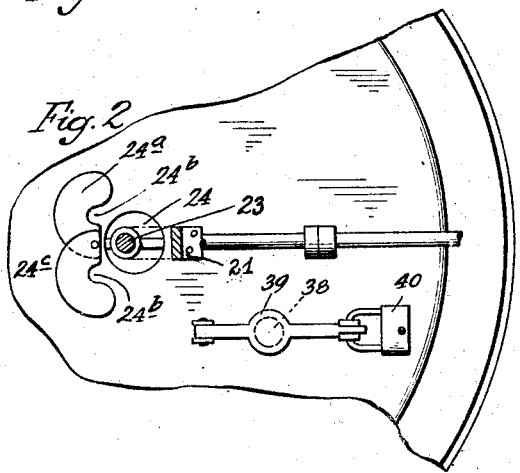
INVENTOR.
Mayer Feld
BY Richards Geier.
ATTORNEYS.

Patented Feb. 24, 1925.

1,527,352

UNITED STATES PATENT OFFICE.

MAYER FELD, OF MERRICK, NEW YORK.

FLUID-DISPENSING DEVICE.

Application filed May 4, 1923. Serial No. 636,755.

*To all whom it may concern:*

Be it known that I, MAYER FELD, a citizen of the United States, residing at Merrick, county of Nassau, and State of New York, have invented certain new and useful Improvements in Fluid-Dispensing Devices, of which the following is a specification.

This invention relates to fluid containing and measuring devices and while the constructional details of the invention as hereinafter set forth are adapted to be used for a diversity of purposes, it is the principal object to provide a device particularly adapted for the dispensing of milk in the form commonly called "loose milk" as distinguished from the distribution thereof in bottles. It is well known that there are many objectionable features both from a sanitary and commercial standpoint in the usual methods of distribution of loose milk in large cans from which it is dispensed to the consumer, among which the following may be noted.

The continual opening of the cans permits admission of dust, dirt and bacteria to the contents thereof, and it is also extremely difficult to keep the large cans properly iced to prevent souring of the milk. Again, it is a common practice for many retailers and distributors to adulterate the milk after it has left the pasteurizing plant. Furthermore, it is practically impossible to secure an even distribution of the cream and butter fats in the loose or bulk milk by the stirring of the contents of the cans by the ladle which is commonly used for this purpose before the milk is dipped out of the can and as a result thereof the last contents of the can are usually deficient in butter fat.

It is therefore an object of this invention to provide a large tank which is provided with an inner liquid containing tank spaced from an outer tank to provide an ice containing space, and to provide a cover which may be securely locked at the pasteurizing plant not only to prevent adulteration of the milk, but also to prevent contamination thereof.

Another object is to provide a liquid measuring dispensing device which will permit a measured quantity to be withdrawn from the large container without exposing the contents of the tank to contamination.

A further object is to provide a simple inexpensive construction of the said measuring device which will enable it to be readily disassembled for cleaning and sterilizing.

Another object is to provide an agitator for stirring the contents of the main container so as to ensure a thorough distribution of the butter fats.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a central longitudinal section through the main container showing it mounted upon a vehicle for transportation.

Fig. 2 is an enlarged plan view partly broken away of the main container cover.

Fig. 3 is an enlarged detail view of the agitator shaft aperture closing means showing the halves thereof in operative or closed position.

Fig. 4 is an enlarged vertical section on the line 4—4 of Fig. 1.

Fig. 5 is an enlarged detail side elevation of the fluid measuring device, and

Fig. 6 is a sectional detail of the air relief valve of the measuring device.

As shown in the drawings the main container indicated generally by the numeral 10 is mounted upon the chassis 11 of any suitable vehicle, the container 10 preferably being mounted within a compartment 12 at the rear of which is provided a dispensing platform 13.

The main container consists of an inner liquid container 15 having a large aperture at its top which is closed by a suitable cover 16. Surrounding the entire portion of the inner container except at the top thereof is an outer container 18 which is spaced from the inner container to form an ice compartment 19.

It will be noted that the cover 16 when removed permits access to the liquid container 15 and removal of the agitator. Rotatably mounted within the inner container and supported in suitable upper and lower bearings 20 and 21 respectively is a helical agitator 22 having its shaft 23 projecting outwardly through an aperture 24 in the cover 16. A bevel gear 25 is fixed to the projecting end of the shaft 23 and meshes with a similar gear 26 fixed to a horizontal shaft 27 rotatably mounted in bearings 28 extending upwardly from the cover 16. Suitable collars 29 are provided to prevent endwise movement of the shaft 27 relatively of the bearings and the rear end of the shaft is squared as shown in Fig. 4 to engage within a socket 30 secured to the end of a short horizontal shaft 31 in alignment with the shaft 27.

A bevel gear 32 secured to shaft 31 meshes with a similar gear 33 upon the end of a vertical shaft 34 adapted to be driven by the crank handle 35, shaft 36 and gearing 37 for actuating the agitator 22 in a manner which will be readily understood.

An additional aperture 38 for the insertion of a filling pipe is provided with a hinged cover 39, which cover is adapted to be locked in any suitable manner as for example by the padlock 40. A locking bar 41 will also be provided for locking the main cover 16 to prevent its removal by unauthorized persons. It will be noted by referring to Fig. 1 that the aperture 24 is eccentric of the shaft 23 to allow sufficient endwise movement of the cover 16 with respect to shaft 23 to permit disengagement of the shaft 27 from the socket 30, and a pair of closure plates 24ᵃ each provided with a cut out 24ᵇ are pivoted as at 24ᶜ to cover 16 to enable the aperture 24 to be completely covered as shown in Fig. 3 or to be opened to permit the removal of the cover 16.

As clearly shown in Fig. 1, the wall of the outer container 18 is flanged inwardly adjacent the bottom of the rear side thereof to contact with the wall of the inner container to provide a recess 42 which is preferably of circular form in transverse section. The walls of the inner and outer containers are in contact at the base of this recess and an outlet aperture 43 is drilled through the juxtaposed walls to permit the contents of the container 16 to be rapidly drawn off when desired. A bushing 44 provided with a tapped hole 45 is threaded into the aperture 43 and the inner end of a valve fitting 46 having a lever 47 is adapted to be screwed into the hole 45. The outer end of the valve fitting 46 is screwed into the rear cap 48 of a fluid measuring container 49, in the front cap 50 of which is screwed a valve 51.

Valve 51 terminating in a spout 52 is provided with an extended handle 53 apertured as at 54 to receive one end of a connecting link 55 having its other end engaged with a similar aperture 56 in the upper end of the lever 47 of valve 46. The caps 48 and 50 are secured to the container 49 by screw threads so as to permit the removal of the caps for cleaning the interior of the container 49.

A cleaning plug 57 is detachably mounted in the valve 51 to permit a cleaning brush to be readily passed through the valve.

An air valve as shown in Fig. 6 is preferably provided to permit admission and escape of air to and from the measuring container 49 and the said valve is preferably constructed of a lower half 58, frictionally engaged within a suitable aperture in the flange of the front cap 50, and an upper half 59 frictionally engaged within the lower half. The lower half 58 is flanged as at 60 to seat against the cap 50 and its bottom wall is provided with a plurality of small apertures 61. The upper half 58 is rounded at its upper end and drilled as at 62. A small light ball 63 of any suitable material is freely mounted within the halves 58 and 59 when they are assembled and is adapted to be carried by the rise of the liquid which passes through the apertures 61 to close the upper air outlet 62 in the manner common to devices of this character.

The manner of using my invention is as follows, the tank or container 15 being filled at the pasteurizing plant through the filling aperture 38, the closure 39 is locked and the vehicle is driven to the place selected for dispensing. When it is desired to draw off a measured quantity of milk the agitator 22 is first actuated by means of the crank handle 35 and the gearing to mix the butter fats. The handle 53 is then pulled downwardly to permit the contents of the measuring container 49 to flow out of the spout 52. The valves 46 and 51 are so arranged that valve 46 will be closed when valve 51 is opened and vice versa, and the container 49 is so proportioned that it will hold exactly one pint or any other desired quantity. When the handle 53 is returned to its vertical position the valve 51 will be closed and the valve 46 opened thereby permitting the fluid in the main tank 15 to refill the container 49, the air valve permitting the escape and admission of air during the filling and emptying of the measuring container.

When it is desired to clean the main tank 15 the locking bar 41 is removed, and the left hand end (Fig. 1) of the cover 16 is raised sufficiently to permit the cover to be slid to the left for disengaging the shaft 27 from socket 30. The cover is then raised clear of the tank, the aperture 24 being large enough to permit bevel gear 25 to pass therethrough. The agitator 22 may then be removed, it being understood that the bearing 21 is so constructed that it may be withdrawn with the agitator.

While I have shown the measuring container and associated parts in combination with a main fluid tank especially designed for dispensing milk, it will be understood that the construction thereof is equally adapted to any use where it is necessary or desirable to draw off measured quantities of any fluid from a main tank.

Having thus described my invention, what I claim as new and desire to secure by Letters Patent, is—

1. A dispensing apparatus comprising an inner liquid containing tank having a substantially flat bottom, an outer tank spaced from the sides and bottom of said inner tank to provide an intermediate ice compartment, a portion of the wall of the outer tank being in contact with the wall of the inner tank, and a fluid measuring device having a portion thereof mounted in the contacting side walls of both of said tanks and in communication with the interior of the inner tank.

2. A dispensing apparatus including a liquid container having an open top, an agitator within said container having a shaft extending through the open top thereof, a removable cover for said open top through which said shaft extends and which is capable of transverse movement relative to said shaft, and means carried by said cover for driving said shaft and capable of disconnection therefrom when said cover is moved transversely to said shaft.

3. A dispensing apparatus including a liquid container having an open top, an agitator within the said container having a shaft extending through the open top thereof, a removable cover for said open top from which said shaft extends and which is capable of transverse movement relative to said shaft, a second shaft carried by said cover for driving the first named shaft and capable of disconnection from said first named shaft when said cover is moved transversely thereto, and a bearing from one end of said second named shaft from which the latter shaft is also disengaged when said cover is moved transversely relative to the first named shaft.

4. A dispensing apparatus including a liquid container having an open top, an agitator within said container having a shaft extending through the open top thereof, a removable cover for said open top having an opening therein from which said shaft normally extends in eccentric relation relative to the edge of said opening, said cover being capable of transverse movement relative to said shaft, and means carried by said cover for driving said shaft and capable of disconnection therefrom when said cover is moved transversely to said shaft.

5. A dispensing apparatus comprising an open topped inner liquid container and an open topped outer container spaced from bottom and sides of said inner container to provide an ice compartment, an agitator within said inner container, a removable cover to close the open top of said inner container, said agitator having a shaft projecting through an aperture in said cover and provided with a gear upon its outer end, said aperture being of sufficient dimensions to permit the passage of said gear therethrough when said cover is removed, and a pair of closures pivoted to said cover adapted to close said aperture.

In testimony whereof I have affixed my signature.

MAYER FELD.